United States Patent
Yen

(10) Patent No.: US 8,248,718 B2
(45) Date of Patent: Aug. 21, 2012

(54) LENS MODULE AND METHOD FOR ASSEMBLING SAME

(75) Inventor: Shih-Chieh Yen, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 62 days.

(21) Appl. No.: 12/884,190

(22) Filed: Sep. 17, 2010

(65) Prior Publication Data

US 2011/0299180 A1    Dec. 8, 2011

(30) Foreign Application Priority Data

Jun. 3, 2010 (TW) ................................ 99117963 A

(51) Int. Cl.
    *G02B 7/02*    (2006.01)

(52) U.S. Cl. ........................................ 359/819; 359/694
(58) Field of Classification Search .................... 359/819
    See application file for complete search history.

(56) References Cited

U.S. PATENT DOCUMENTS

2007/0047110 A1*  3/2007  Matsushima ................. 359/819
2010/0165491 A1*  7/2010  Chen et al. ................... 359/819

* cited by examiner

*Primary Examiner* — James Jones
(74) *Attorney, Agent, or Firm* — Altis Law Group, Inc.

(57) ABSTRACT

A lens module includes a lens and a lens barrel receiving the lens therein with a gap maintained between a peripheral surface of the lens and an inner surface of the lens barrel. The lens barrel includes a plurality of hole portions with through holes defined therein and facing the peripheral surface of the lens, and a glue applied in the gap to adhere the lens to the hole portions.

7 Claims, 5 Drawing Sheets

LENS MODULE AND METHOD FOR ASSEMBLING SAME

BACKGROUND

1. Technical Field

The present disclosure relates to a lens module and a method for assembling the lens module.

2. Description of Related Art

Lens modules as well as image sensors are key components of camera modules. A typical lens module includes a lens barrel and a lens assembled in the lens barrel. It is critical to image quality that an optical axis of the lens does not deviate from a central axis of the lens barrel. However, generally, the lens barrel has only one end opened, making it difficult to adjust position of the lens once installed in the lens barrel.

What is needed, therefore, is a lens module and a method for assembling same, which can overcome the above shortcomings.

BRIEF DESCRIPTION OF THE DRAWINGS

Many aspects of the present lens module and method can be better understood with reference to the following drawings. The components in the drawings are not necessarily drawn to scale, the emphasis instead being placed upon clearly illustrating the principles of the present lens module and method. Moreover, in the drawings, like reference numerals designate corresponding parts throughout the several views.

DETAILED DESCRIPTION

Figure 1:
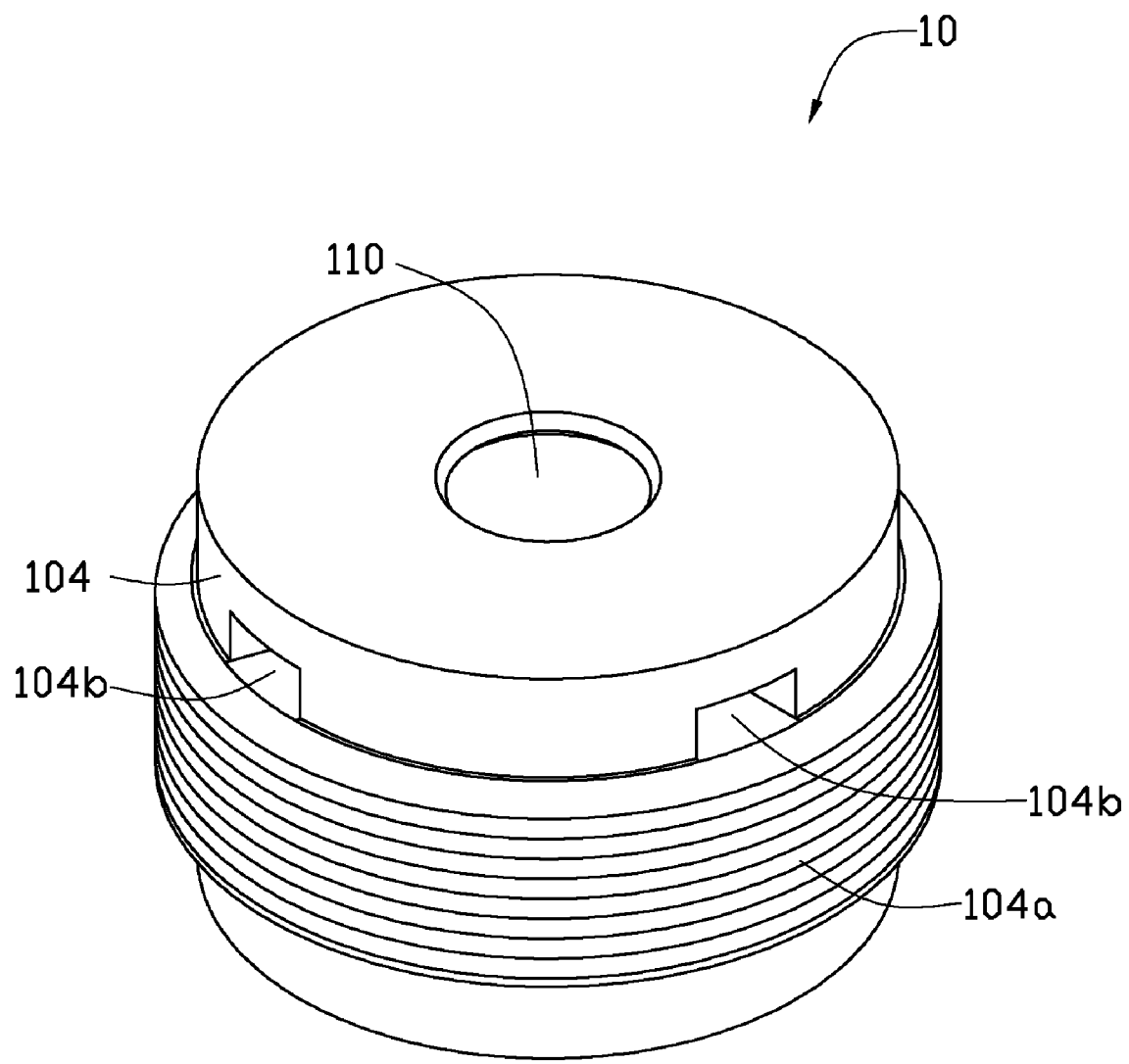
FIG. 1 is an isometric view of a lens barrel in accordance with an embodiment.
Figure 2:
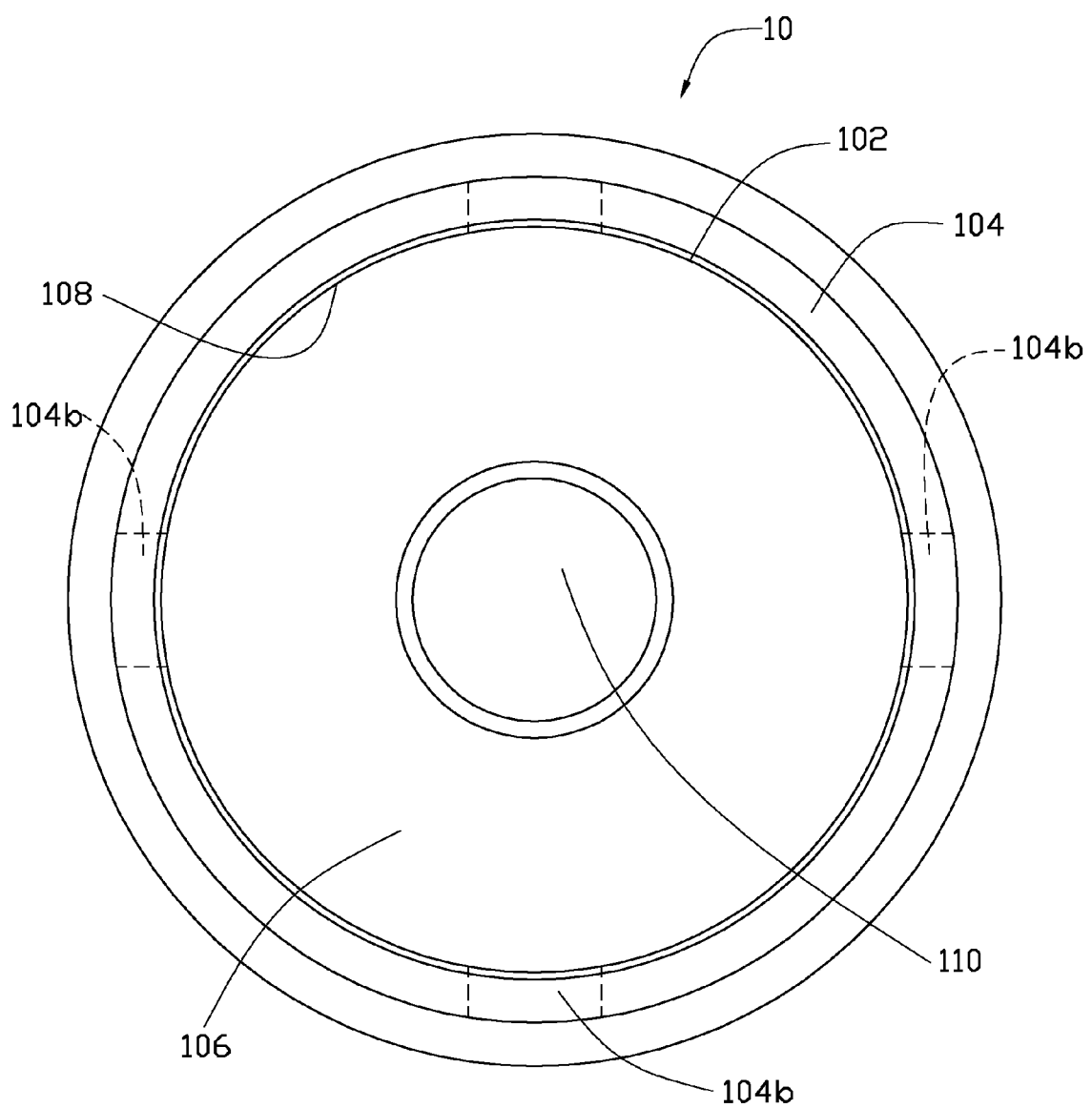
FIG. 2 is a top view of the lens barrel of FIG. 1.
Figure 3:
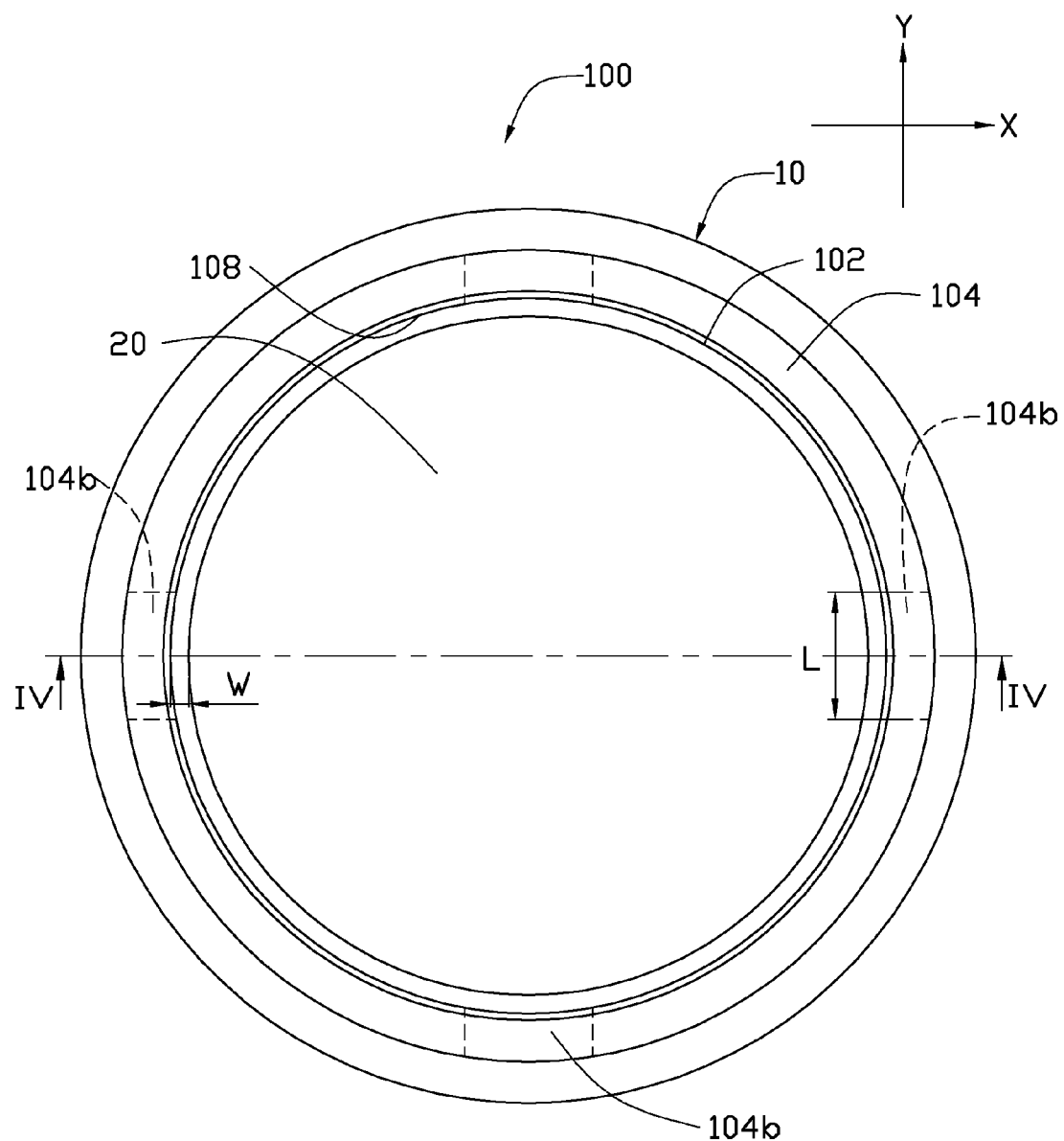
FIG. 3 is similar to FIG. 2, but shows a lens received in the lens barrel of FIG. 2, the lens barrel and the lens forming a lens module.
Figure 4:
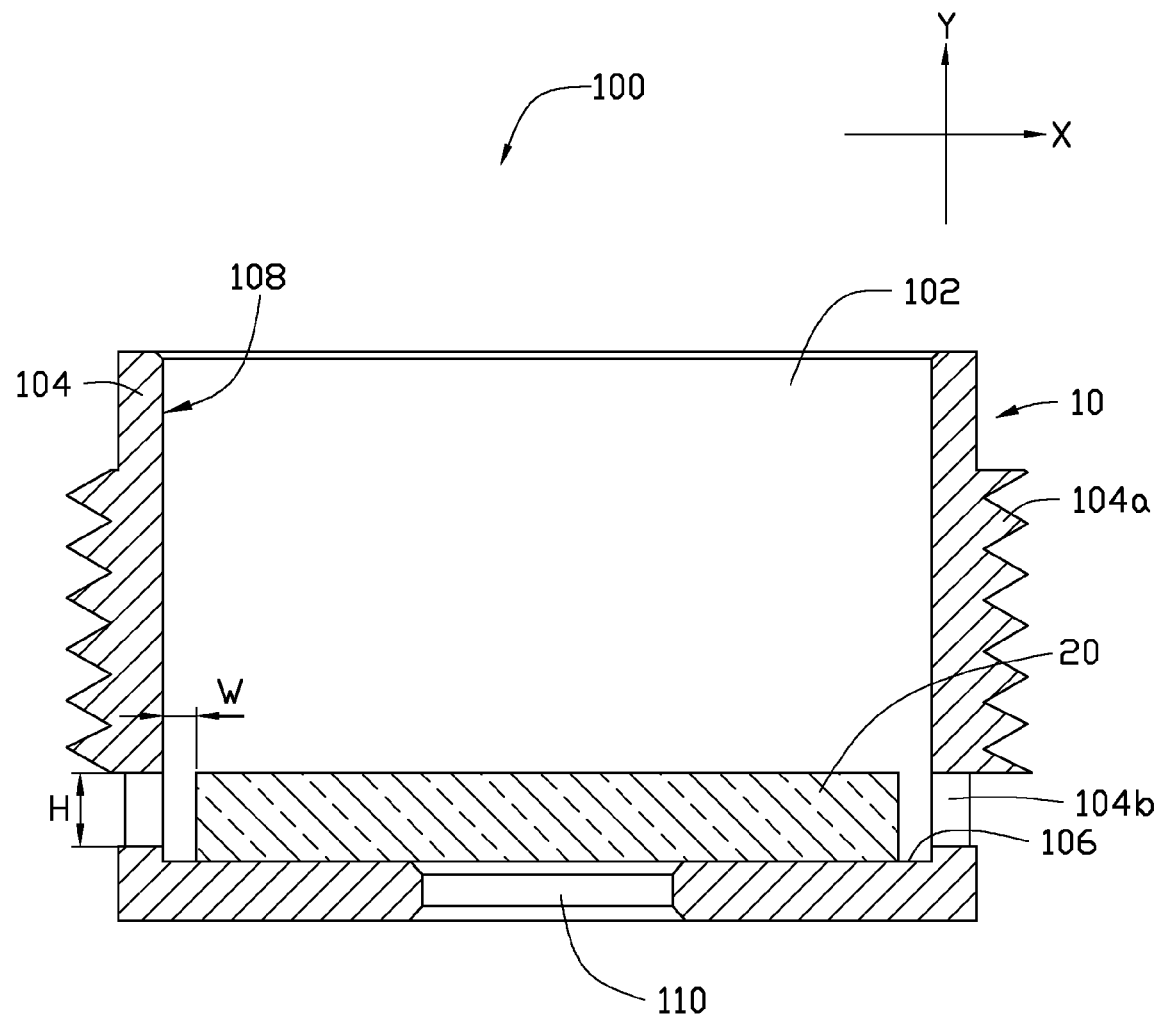
FIG. 4 is a cross sectional view of FIG. 3, taken along line IV-IV.

Embodiments of the present lens module and method will now be described in detail below and with reference to the drawings.

Referring to FIGS. 1 to 4, a lens module 100 in accordance with an embodiment is provided. The lens module 100 includes a lens barrel 10 and a lens 20 received in the lens barrel 10.

The lens barrel 10 includes a receiving space 102 for receiving the lens 20, and a circular-shaped barrel body 104 surrounding the receiving space 102. The lens barrel 10 has a first open end 108 and a second open end 106. The first open end 108 is totally opened, and the lens 20 is disposed into the lens barrel 10 from the first open end 108. The first open end 108 is to be engaged with a barrel holder or a camera body. The second open end 106 includes a bottom wall and a light incident opening 110 formed in the bottom wall. The light incident opening 110 allows passage therethrough of light from outside.

A cylindrical sidewall of the barrel body 104 includes a circled threaded portion 104a formed thereon to threadedly engage with the barrel holder or the camera body, and a plurality of hole portions adjacent to the second open end 106. Each of the hole portions has a through holes 104b formed therein. In the present embodiment, there are four through holes 104b in a circle with two of them arranged opposite to each other along the illustrated X axis, and the other two of them arranged opposite to each other along the illustrated Y axis. The circle where the through holes 104b arranged is perpendicular to a central axis of the lens barrel 10, and a circular-arc of 90 degrees is between each adjacent through holes 104b. A central axis of each of the through holes 104b is perpendicular to that of the lens barrel 10.

A diameter of the lens 20 is a less than an inner diameter of the barrel body 104, and a gap 30 is maintained between each of the through holes 104b and a peripheral surface of the lens 20, with the illustrated width W in a range about $0.5\text{ mm} \leq W \leq 5\text{ mm}$. In the present embodiment, the lens 20 is circular, and the gap 30 is circular.

Figure 5:
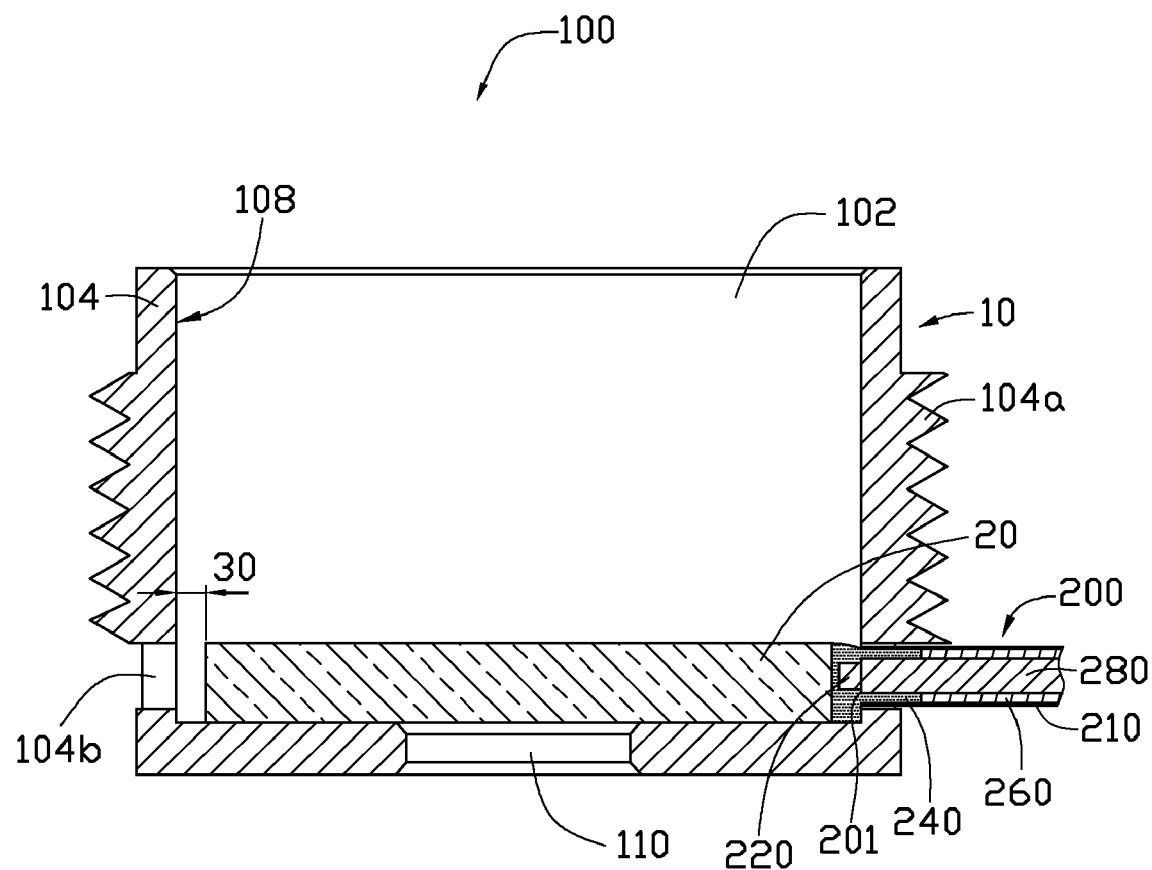
FIG. 5 shows an tool for adjusting and then securing the lens of FIG. 4 in position.

Referring to FIG. 5, after the lens 20 is disposed in the lens barrel 10, the lens 20 is checked for deviation from a central axis of the lens barrel 10, e.g, by a modulation transfer function (MTF) checking system. If yes, a tool 200 is used to adjust and then secure the lens 20 in position.

The tool 200 has a syringe barrel 210. A first piston 260 and a second piston 280 are received in the syringe barrel 210. An end surface 201 of the syringe barrel 210 has a number of glue ejecting holes 240. Glue may be loaded in the syringe barrel 210, and can be ejected out through a selected one or more of the ejecting holes 240 by action of the first piston 260. An adjusting rod 220 is received in the syringe barrel 210 and can be pushed out of the end surface 201 or pulled back into the syringe barrel 210 by action of the second piston 280.

A diameter of the syringe barrel 210 is less than both a length L of each of the through holes 104b and a height H of each of the through holes 104b, such that the syringe barrel 210 can extend into the receiving space 102 of the lens barrel 10. The adjusting rod 220 is configured to push forward the lens 20 from the through holes 104b until the lens 20 is center-aligned with the lens barrel 10.

After the lens 20 is center-aligned with the lens barrel 10, glue is ejected out a selected one or more of the ejecting holes 240 to fill the gap 30, such that the lens 20 is secured in position. Stray light can be prevented from entering the receiving space 102 through the through holes 104b by using opaque glue for sealing the through holes 104b.

The lens barrel 10 can have other lenses mounted therein aligned with the lens 20. It is understood that the lens 20 can also be replaced by a lens assembly which is assembled beforehand before then positioned and secured in the lens barrel 10.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A lens module, comprising:
    a lens; and
    a lens barrel receiving the lens therein with a gap maintained between a peripheral surface of the lens and an inner surface of the lens barrel, the lens barrel comprising a plurality of hole portions with through holes defined therein, the hole portions facing the peripheral surface of the lens, and a glue applied in the gap to adhere the lens to the hole portions, wherein the through holes are in pairs, and the through holes in each pair are symmetrical about a center axis of the lens barrel.

2. The lens module of claim 1, wherein a central axis of each of the through holes is perpendicular to a central axis of the lens barrel.

3. The lens module of claim 2, wherein the through holes are arranged in a circle which is perpendicular to the central axis of the lens barrel.

4. The lens module of claim 1, wherein the glue is opaque and seals the through holes.

5. The lens module of claim 1, wherein the lens barrel has an open end with a light incident opening, the lens is arranged at the open end and directly face the light incident opening, the through holes are adjacent to the open end.

6. A method for assembling a lens module, the method comprising:

providing a lens barrel and a tool, the lens barrel comprising a receiving space and a plurality of through holes formed in a sidewall thereof in communication with the receiving space, wherein the tool comprises a syringe barrel having a plurality of glue ejecting hole, a first piston, a second piston, and an adjusting rod, the first piston and the second piston are received in the syringe barrel, an end surface of the syringe barrel has a number of glue ejecting holes, glue is loaded in the syringe barrel, and is capable of being ejected out through a selected one or more of the ejecting holes by action of the first piston, the adjusting rod is received in the syringe barrel and is capable of being pushed out of the end surface or pulled back into the syringe barrel by action of the second piston; and placing a lens into the lens barrel with a gap maintained between a peripheral surface of the lens and an inner surface of the lens barrel, the through holes facing the peripheral surface the lens;

determining if the lens is deviated from a central axis of the lens barrel;

inserting the adjusting rod into the receiving space through a selected one of the through holes, and pushing the second piston to drive the adjusting rod to resist with the lens, and thus to align the lens with the central axis of the lens barrel if the lens is deviated from the central axis of the lens barrel; and pushing the first piston to inject glue into the gap from the glue ejecting holes to secure the lens in position.

7. A lens module, comprising:
a lens having a circumferential surface; and
a lens barrel having a cylindrical sidewall and a bottom wall with an opening defined therein, the lens received in the lens barrel and mounted on the bottom wall, the lens spaced from the cylindrical sidewall, the cylindrical sidewall comprising a plurality of hole portions with through holes defined therein, the hole portions facing the circumferential surface of the lens, wherein the through holes are in pairs, and the through holes in each pair are symmetrical about a center axis of the lens barrel, and an opaque glue applied between the hole portions and the circumferential surface of the lens, the glue sealing the through holes.

* * * * *